Jan. 26, 1954

J. H. BACON 2,667,012

BIRD CAGE WHISTLE

Filed June 23, 1951

INVENTOR.
John H Bacon
BY
Ezekiel Wolf
his Attorney.

Patented Jan. 26, 1954

2,667,012

UNITED STATES PATENT OFFICE 2,667,012

BIRD CAGE WHISTLE

John H. Bacon, Wellesley, Mass.

Application June 23, 1951, Serial No. 233,222

7 Claims. (Cl. 46—44)

The present invention relates to a toy whistle of a very simple construction in which the object accomplished is to provide a small figure of a bird or other figurine with a dancing, hopping or other varied motion by the blowing of the whistle.

A further object of the present invention is to provide an extremely simple construction in which a small bird figure, apparently is seated on a roost, will jump up and down when the whistle is blown.

A further object of the present invention is a simplified construction wherein the whistle may be moulded in two separable halves with the bird and its supporting element inserted in position before the two halves are cemented together.

A further object of the present invention is to provide an extremely simple construction which may be produced at extremely low cost and which will produce when blown a remarkably strong note of good quality with an agreeable modulation which is provided by the bird and its supporting element freely positioned in the chamber of the whistle and restrained only through the connection or supporting wire which supports the small bird figure.

Further objects and merits of the present invention will be more readily understood from a description set forth in the specification below when taken in connection with the drawings in which.

Figure 1:
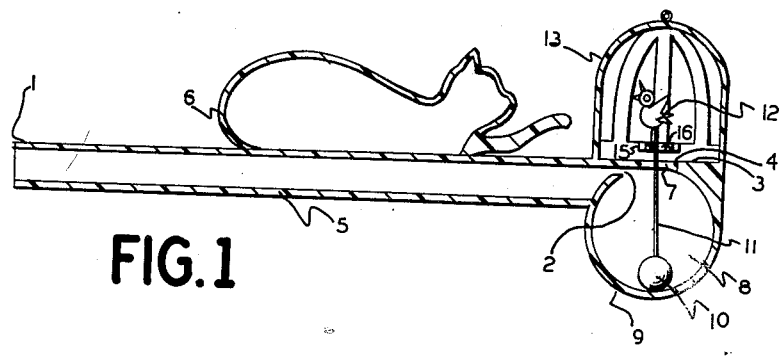
Figure 1 shows a side elevation of the whistle.

In the arrangement indicated in the drawing the whistle comprises a mouthpiece 1 with a passage which at the end is reduced as indicated at the right end of the mouthpiece to a thin air passage 2 which terminates in an opening which is opposite a sharpened lip 3 so that the air blast coming out of the narrow passage 2 is split by the sharp edge 4 of the lip 3. The mouthpiece 1, of course, has an elongated pipe 5 which may support the figure of an animal, for instance a cat 6, which looks towards the bird cage. Between the opening of the air passage 2 and the edge of the lip 4 is a mouth-opening 7 for the chamber 8 enclosed by the shell 9 which may be spherical in character and which is formed as an integral part of the rest of the whistle. The chamber 8 is provided with a small cork ball 10 which may however, be made of other suitable material, which cork ball has a steel or spring wire 11 projecting radially from it which in turn supports at its end a light bird figure 12 above the mouth opening. A suitable cage structure 13 projecting upwards from the outside of the shell 9 may enclose the bird. Projecting inwardly from the cage structure or shell are two bar elements 14 and 15 which taper in size towards the center and which are terminated at their inner ends in a concave arc or curve as indicated at 16 and 17.

Figure 2:
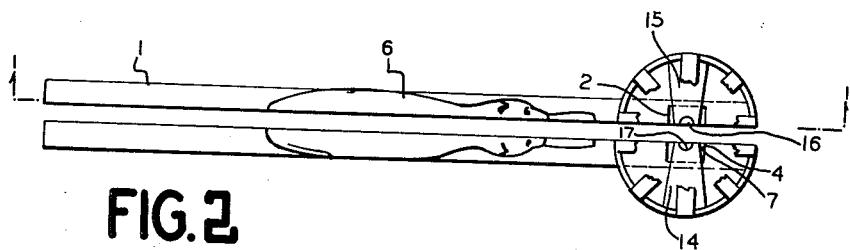
Figure 2 shows a plan view of the two moulded sections with portions of the cage broken away to show the supporting element for the bird.
Figure 3:
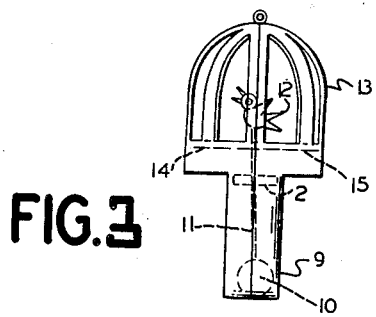
Figure 3 shows a side view of the whistle as seen from the right of Figure 1.

As indicated more clearly in Figure 2, the whistle is preferably moulded in two parts joined along a longitudinal line through the mouthpiece 1. These two halves are symmetrical in structure and come together along a center line so that when the two bar elements 14 and 15 which combine to form a roost for the bird come together, the wire 11 is confined in a substantially circular hole smaller than the cork or the bird itself. By this means, the motion of the bird is confined in all horizontal directions. However, in a vertical direction, the cork ball may jump up and down so that the bird which follows the movement of the cork will jump around its cage. This jumping is not confined vertically up and down as the hole is somewhat larger than the wire and permits the bird to move to all sides of the cage. When the whistle is blown, the air blast emerging from the passage 2 and striking against the lip 3 will stir up the air in the chamber 8 to such an extent that the cork ball 10 will jump up and down within the chamber. In this way, considerable and natural animation of the bird figure 12 is effected. The whistle may be constructed of moulded plastic materials cemented together or of any other material suitable for the purpose.

The construction and figures in the present whistle may be varied providing the same result and effect is obtained without departing from the spirit of the invention.

Having now described my invention, I claim:

1. A toy whistle of the type described comprising means providing a mouthpiece terminating in a narrow passage, means providing a chamber connected to said mouth piece through said narrow passage with a mouth opening positioned adjacent the narrow passage and a lip aligned to receive the air blast blown out through the passage, a small ball like element loosely positioned in said chamber having a supporting wire extending therefrom, a small object to be animated mounted on the wire, and means for limiting the lateral motion of the wire at the mouth opening.

2. A toy whistle of the type described comprising means providing a mouthpiece terminating in a narrow passage, means providing a chamber connected to said mouth piece through said narrow passage with a mouth opening positioned adjacent the narrow passage and a lip aligned to receive the air blast blown out through the passage, a small ball like element loosely positioned in said chamber having a supporting wire extending therefrom, a small object to be animated mounted on the wire, and means for limiting the lateral motion of the wire at the mouth opening, comprising a fixed element extending over the mouth opening having a hole therethrough through which said wire projects.

3. A toy whistle of the type described having two moulded symmetrical longitudinal elements secured together comprising a mouthpiece terminating in a narrow passage, means providing a chamber connected to said mouth piece through said narrow passage with a mouth opening positioned adjacent the narrow passage and a lip aligned to receive the air blast blown out through the passage, a small ball like element loosely positioned in said chamber having a supporting wire extending therefrom, a small object to be animated mounted on the wire, and means for limiting the lateral motion of the wire at the mouth opening, comprising bar elements projecting laterally inwardly over the mouth opening having inner curved edges forming a hole over the mouth opening enclosing the wire.

4. A toy whistle of the type described comprising means providing a mouthpiece terminating in a narrow passage, means providing a chamber connected to said mouth piece through said narrow passage with a mouth opening positioned adjacent the narrow passage and a lip aligned to receive the air blast blown out through the passage, a small ball like element loosely positioned in said chamber having a supporting wire extending therefrom, a small object to be animated mounted on the wire, and means for limiting the lateral motion of the wire at the mouth opening, and means simulating a cage formed over and around the mouth opening.

5. A toy as set forth in claim 1 in which said small object has the form of a bird.

6. A toy as set forth in claim 4 in which said object has the form of a bird.

7. A toy whistle of the type described, comprising means forming a chamber having a mouth opening with a thin lip at one side, a mouth piece connected to said chamber and having a small opening to the chamber aligned with said lip, a ball of light material freely positioned in said chamber with a stem projecting from one end thereof extending through said chamber adjacent said lip, means positioned above said chamber providing a hole through which said stem projects in a loose fit and a small toy object mounted at the end of the stem whereby when said whistle is blown, said object will be animated.

JOHN H. BACON.

References Cited in the file of this patent

UNITED STATES PATENTS

| Number | Name | Date |
|---|---|---|
| 1,445,362 | Schwarzkopf | Feb. 13, 1923 |
| 2,397,552 | Lester et al. | Apr. 2, 1946 |